Nov. 3, 1942.  L. S. LONGENECKER  2,300,427
GLASS MELTING FURNACE
Filed June 29, 1940  2 Sheets-Sheet 1

INVENTOR
Levi S. Longenecker
By Green & McCallister
His Attorneys

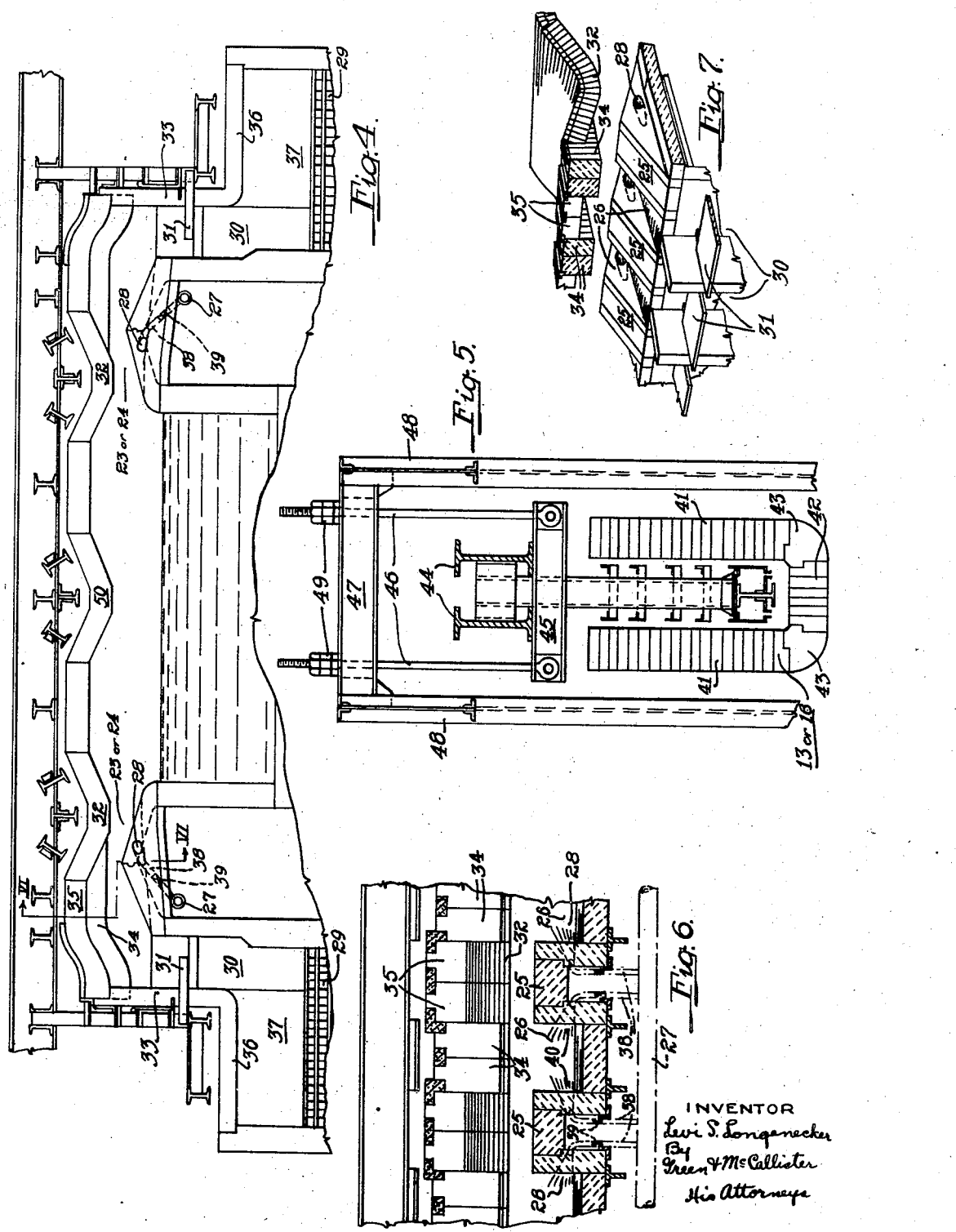

Patented Nov. 3, 1942

2,300,427

UNITED STATES PATENT OFFICE 2,300,427

GLASS MELTING FURNACE

Levi S. Longenecker, Mount Lebanon, Pa.

Application June 29, 1940, Serial No. 343,188

20 Claims. (Cl. 49—54)

This invention relates to glass melting furnaces and more particularly to side fired furnaces of the regenerator type.

These furnaces generally comprise a tank for holding a molten bath of glass, a heating chamber above the tank and having burner slots or ports along opposite sides thereof throughout the length of the melting and boiling, as well as the refining and degassing zone. No firing is done in the cooling zone and in some cases what is known as a shadow wall is placed between the refining and degassing zone and the cooling zone for the purpose of keeping the flames from entering the cooling zone.

The batch or glass making materials which are granular in form, are usually introduced into the tank through what is known as a "dog house" and which is located at the outer end of the melting and boiling zone. The furnace roof is of the same height over the different zones and the burner slots or ports in the melting and boiling zone are usually of the same height as those in the refining and degassing zone although it has been the tendency to vary the amount of fuel and air admitted to the different zones or to portions of the same zone.

While the prior patented art discloses at least one glass melting furnace which is provided with what may be termed long continuous ports, so far as I am aware, such ports are not being used in any commercially successful furnace. The patent referred to was issued on August 6, 1935, and is numbered 2,010,419. This patent also discloses flat suspended roof sections over the furnace heating chamber as well as over the ports and over the regenerator chambers, but so far as I am aware, no commercial furnaces employing such ports or roofs have ever been used in commercial furnaces of this type.

Since these glass melting furnaces are reversed during operation, the ports not only serve to deliver to the furnace chamber, the combustible mixture made up of fuel and preheated air, but serve as outlet ports for the hot products of combustion as they leave said chamber on their way to the regenerator or regenerators adjacent thereto; gas as well as air regenerators being employed, if a lean gas such as producer gas is used as the fuel.

In all side fired regenerative glass melting furnaces, in use today, so far as I am aware, the roofs are of the sprung arch type and in most of the same the roofs are of the same height from end to end of the furnace heating chamber.

The tank of a glass melting furnace with the molten glass bath therein comprises three zones. These extend across the molten bath from one side of the tank to the other and are arranged end to end lengthwise of the tank. The first zone, or that into the outer end of which the granular batch or glass making material is fed, is known as the melting and boiling zone. The next or second zone is known as the refining and degassing zone while the third zone is known as the cooling zone. No fuel is delivered into the cooling zone, since it is here that the bath loses temperature. The glass is withdrawn from the tank at the outer end of this zone.

In the melting and boiling zone, the temperature is built up to top temperature at the foam line, primarily by convection or surface heating. The heat input to the furnace heating chamber above this zone must be sufficient, to not only offset the tank and stack losses, but to raise the temperature of the exposed molten glass bath and batch material, and those portions of the molten bath covered by such material to a temperature of approximately 2800° F. The endothermic requirements due to the chemical reactions which occur in converting the batch or glass making materials into molten glass must also be satisfied.

In the refining and degassing zone, an attempt is made to hold the bath at the top temperature which it acquires in the melting and boiling zone. One of the heating problems in this zone is that of obtaining sufficient depth penetration by radiation to secure proper degassing and refining.

The heat input to the furnace heating chamber above this zone must be sufficient to offset the tank and stack losses and to not only hold the surface of the molten bath at the top temperature reached by it in the melting and boiling zone, but to raise the body of the bath below the surface to such temperature as to obtain successful refining and degassing.

An object of this invention is to produce a novel and improved construction of glass melting furnace.

Another object is to produce a novel and improved construction for the melting and boiling zones, and the refining and degassing zones of a glass melting furnace of the regenerative side fired type.

Another object is to produce a novel and improved construction of glass melting furnace of the regenerative side fired type by means of which the maximum permissible B. t. u. release may be obtained in the melting and boiling zone as well as in the refining and degassing zone with a minimum expenditure of fuel.

A still further object is to produce a novel construction by means of which it is possible to obtain on the foam line the maximum permissible B. t. u. release without melting the batch or glass making material at a rate such as to produce puddles of the low melting fluxes.

A still further object is to provide a novel construction for obtaining a band of radiant heat which extends transversely across the bath adjacent the foam line and which augments the heating flames traversing the heating chamber above the foam line and thus assists in obtaining the desired heat transfer at the foam line.

Another object is to produce a glass melting furnace having flat suspended roof sections over its boiling and refining zones with the height of such sections determined in accordance with the maximum permissible B. t. u. release required in those zones.

A still further object is to produce a glass melting furnace having flat suspended roof sections for the different furnace zones and in which the height of each such section is determined by the B. t. u. release required in such zones.

These, as well as other objects which will appear to those skilled in this particular art, I attain by means of the furnace structure disclosed in the specification and more or less diagrammatically illustrated in the drawings accompanying and forming part of this application.

In the drawings:

Fig. 4 is a more or less diagrammatic view in transverse sectional elevation of a furnace of this invention and is typical of either the melting and boiling zone or the refining and degassing zone of the furnace of Figs. 1, 2 and 3;

Fig. 5 is a more or less diagrammatic view in end elevation of one of the shadow walls such as I may employ for separating the zones of the furnace of this invention;

Fig. 6 is a fragmentary view in vertical section taken on line VI—VI of Fig. 4; and Fig. 7 is a perspective view illustrating the port floor and roof structure as viewed from the left side of Fig. 4.

Figure 1:
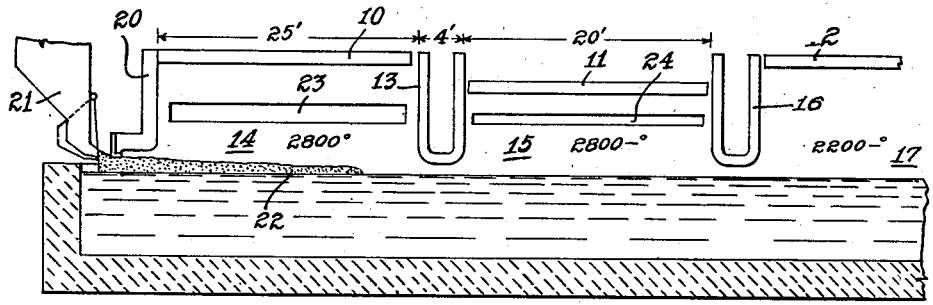
Figure 1 is a schematic view in longitudinal section of a glass melting furnace embodying my novel construction. In this view, but a small portion of the cooling zone of the furnace is shown.

The construction shown in Fig. 4 is adapted to the use of natural gas or oil as the fuel and because of this, but two regenerators are used, one on each side of the furnace for preheating the air.

The structure of Fig. 4 is disclosed in an application filed by me on June 29, 1940, and serially numbered 343,186. If a lean gas, such as producer gas is used, a pair of regenerators for each side of the furnace will be necessary and when such a gas is utilized, I make use of the furnace structure disclosed in an application filed by me on June 29, 1940, and serially numbered 343,187.

In each of the glass melting furnaces diagrammatically illustrated in the drawings, the roof of the heating chamber above the tank is preferably divided into three sections 10, 11 and 12 and each of these sections is of the suspended type shown in Fig. 4 of the drawings and as disclosed in my applications above referred to. Roof section 10 covers the melting and boiling zone. Section 11 covers the refining and degassing zone, while section 12 covers the cooling zone.

In the furnace of Fig. 1, a shadow wall 13 separates the melting and boiling zone 14 from the refining and degassing zone 15 and a shadow wall 16 separates the refining and degassing zone from the cooling zone 17.

Figure 2:
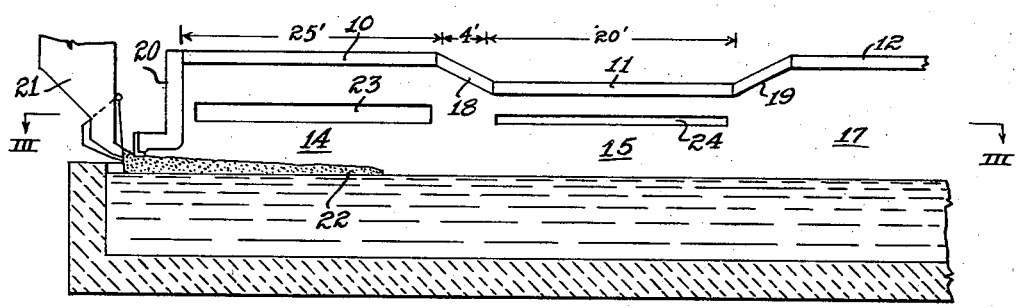
Fig. 2 is a view similar to Fig. 1, but illustrates a modified form of construction of furnace embodying certain features of this invention.

In the form of furnace shown in Fig. 2, roof section 11 over the refining and degassing zone is joined to roof sections 10 and 12 over the melting and boiling zone, and the cooling zone, respectively, by inclined roof sections 18 and 19. In the furnace of Fig. 2, the shadow walls are omitted.

In both of the furnaces of Figs. 1 and 2, the tank at the batch material feeding end is provided with an extension which projects beyond the outer end of roof section 10 as shown in an application filed by me on June 29, 1940, and which is serially numbered 343,185. The end of the furnace heating chamber adjacent this tank extension is closed by means of an end wall 20 which is supported independently of the furnace roof and walls and is vertically adjustable as shown in said latter application.

Figure 3:
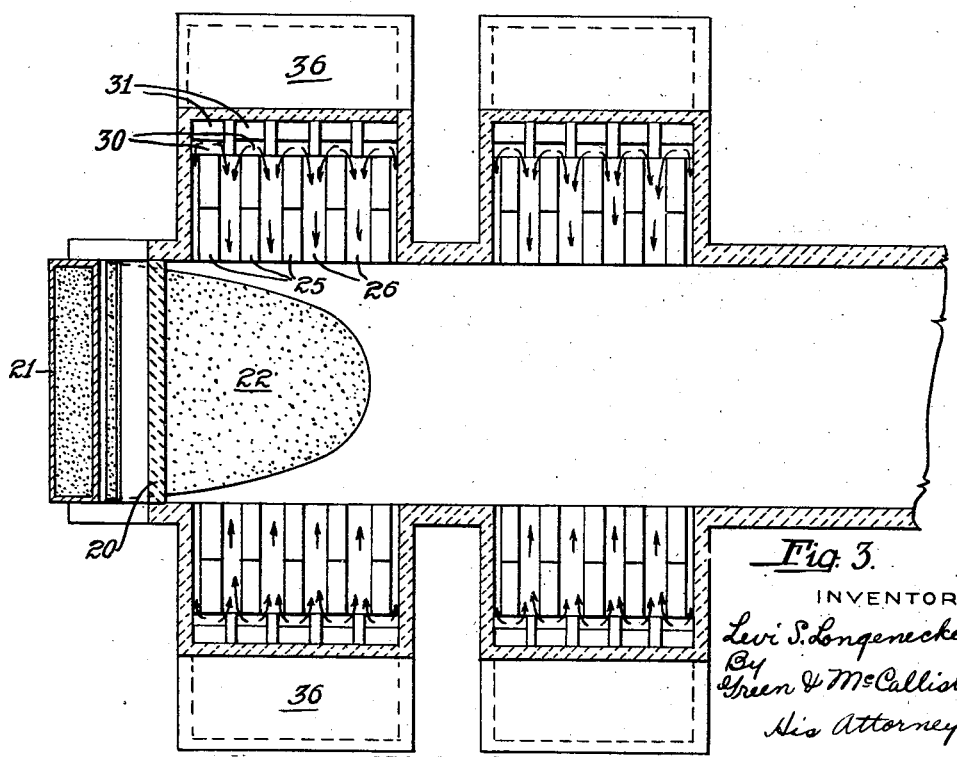
Fig. 3 is a view in plan of the furnace of Figs. 1 and 2 and is taken on a horizontal plane just above the floors of the ports with the shadow walls of Fig. 1 omitted.

The granular batch or glass making material is fed onto the surface of the molten bath in the tank extension by a batch feeder 21, such as disclosed in one or the other of joint applications of H. L. Halbach, Walter G. Koupal and William Owen and in accordance with the method of said joint applications. The batch blanket 22 resulting from such batch feeding method assumes an outline more or less resembling that shown in Fig. 3, and extends from batch feeder 21 to the foam line which is adjacent to shadow wall 13.

The furnace chamber on opposite sides of zone 14 is provided with relatively deep continuous ports 23, since heavy firing is required in this zone and this roof section 10 above this zone is placed at such a height as to accommodate this heavy firing.

Zone 15 is provided with somewhat shallower continuous ports 24, since only medium firing is required in this zone. To accommodate this medium firing, roof section 11 is placed at a less height than roof section 10.

Roof section 12 of the cooling zone 17 is placed at substantially the same height as roof section 10.

In the furnace of Fig. 2, the different heights of the roof sections over zones 14, 15 and 17, are relied on to secure furnace zoning. Ports 23 and 24 of the furnace of Fig. 2 are the same as ports 23 and 24 of the furnace of Fig. 1.

These ports, if natural gas or oil is to be used as fuel, will, as above stated, preferably be constructed as disclosed in my application Serial No. 343,186, and as disclosed in Figs. 4, 6 and 7 of the drawings of this application. The floor of each port is crenellated or made up of alternate hollow high sections 25 and low sections 26. The fuel, natural gas or oil, supplied by a header pipe 27 is discharged into the crenelles or low sections by means of burner orifices 28 which extend through the sides of the merlons, cops or high sections.

Ports 23 and 24 for zones 14 and 15 respectively are of the same construction, but as before pointed out, are of different depths or capacities. The air for supporting combustion is preheated in checker chambers 29 and reaches the ports by way of uptake flues 30 which are controlled by dampers or gates 31.

The roof of each port is formed by a suspended roof knuckle 32 which extends the full length of the port, and which in conjunction with the port floor, acts as a venturi and increases the air velocity to a point where it is greater than the velocity of propagation of the flame. The flame ribbon or blanket issuing from the port finds its anchor within or adjacent the throat of the venturi formed by the port floor and knuckle-like roof.

That portion of the furnace roof located between each of the knuckles 32 and the adjacent vertical or apron wall 33 of the adjacent regenerator uptakes is made up of alternately arranged courses of long tile or blocks 34 and short tile or blocks 35. The courses of long blocks in effect provide guiding vanes which extend from said vertical walls 33 to knuckle 32 and not only prevent side slipping of the preheated air stream as it flows from the regenerator uptake to the port, but combs the upper portion of the air stream into parallel sections.

The suspended roof 36 of each generator, it will be noted, is located a considerable distance below the port floor. The regenerator uptakes, which are divided into flues 30, are of materially less cross sectional area than manifold chamber 37 and this increases the velocity of the preheated air flowing upwardly through the uptake flues sufficiently to make the port floor with its cops, crenelles, and the roof guiding vanes, most effective in combing both the top and bottom portions of the air and fuel streams into parallel stream sections or lines of flow. The fuel streams contact the combed under side of the air stream with a minimum amount of interference. This improves the luminosity of the flame and also prevents any localized hot spots.

The air stream not only blankets and thus protects the furnace roof and knuckles 32 but portions of such stream flow through the crenelles of the port floor, and it is into these portions that the fuel is directed through burner orifices 28.

The fuel is fed into burner orifices 28 by means of branch pipes 38 which connect with fuel header 27 and each branch is provided with a fuel regulating valve 39. The oppositely directed fuel streams (indicated at 40) entering each crenelle of the port floor, meet, and, deflecting one another, are directed toward the port outlet. The air stream portions traversing the crenelles in which combustion is initiated, and the deflection of the fuel streams, combined with the expansion due to this initial combustion, causes the fuel and air streams traversing the crenelles to fan out laterally so as to overlap the merlons or cops at the tank or outlet end of the port, thus producing a continuous ribbon or blanket of the combustible mixture of air and fuel.

As the upper or main portion of the air stream flowing in contact with the roof of the port, formed by knuckle 32, is deflected downwardly thereby, its lower portion comes in contact with the horizontally fanned out fuel streams and produces a ribbon or blanket of flame which completely covers the surface of the bath in front of the port.

Dampers or gates 31 for the flues of the regenerator uptakes are utilized for varying the amount of air supplied to different sections of the port. These dampers are of particular value in the uptake flues leading to ports 23 (the ports for the melting and boiling zone) for by using the same, and valves 39, I in effect establish zones within each port which receive different volumes of combustible mixture. These zones extend across the furnace from port to port, and the combustible mixture supplied to each zone is so directed by my port floor and knuckle, that a uniform mixture of fuel and air is supplied throughout the full width of each zone, whereby I secure the maximum permissible B. t. u. release above every square foot of glass or batch located therein.

As I have pointed out, the merlons or cops of the port floor comb the lower portion of the air stream into parallel flow lines, thus preventing side slipping of the stream toward either end of the port and cause the continuous ribbon-like flame or blanket issuing from the port outlet to travel straight across the furnace chamber.

The merlons or cops serve as vanes to hold the air and fuel streams in parallel lines and direct them across the tank with a minimum of turbulency. These parallel line streams also serve as flame temperature controllers by preventing too rapid intermixing of air and fuel. By introducing the fuel into the crenelles of my port floor I am able to operate with a much lower fuel pressure than used in the present day commercial glass melting furnaces.

I locate knuckle 32 at the proper position to place the shadow or cold spot so that it falls on the port floor instead of on the surface of the bath directly in front of the port as it does in the present day commercial type furnaces. These cold spots are not only idle surfaces, but are especially harmful in the boiling zone.

By utilizing relatively long continuous ports such as disclosed, it is possible to place the point of heaviest firing so that it will at all times completely blanket the boiling zone and particularly the foam line.

Shadow walls 13 and 16 are preferably constructed as more or less diagrammatically disclosed in Fig. 5, and each comprises a hollow U-shaped refractory wall made up of vertically extending portions 41, a lower or bottom portion 42 and nose portions 43 which connect the vertically extending portions and the lower or bottom portion. These shadow walls are supported by horizontally extending beams 44 which extend above the furnace roof and are carried by short beam sections 45. Beam sections 45 are supported by spaced rods 46 which project through openings in beams 47 carried by buckstays 48, one pair only of which is shown, the other pair being located on the opposite side of the furnace. The upper ends of rods 46 are threaded to receive adjusting and lock nuts 49 and by means of these nuts, each shadow wall may be raised or lowered so as to position its lower face at the proper distance above the normal level of the glass bath within the tank.

Shadow wall 13 definitely separates zone 14 from zone 15 while shadow wall 16 definitely separates zone 15 from zone 17. These shadow walls, due to the fact that their surfaces are white hot, with their lower surfaces in close proximity to the glass bath, each radiates a band of intense heat which extends across the furnace from tank side to tank side. These bands of radiated heat tend to cause the glass bath to reverse its flow and in so doing serve as skimmers and prevent any scum or unmelted batch material from passing from one zone to the next.

In present day glass melting furnaces, the furnace temperature adjacent the outgoing ports may be as much as from three to four hundred degrees lower than that adjacent the incoming ports. This applies to furnaces of normal width from port to port and the difference may be even greater in extremely wide furnaces. This in large measure is due to the fact that a considerable portion of the fuel passes through the outlet half of the heating chamber without being burned.

In order to prevent such a condition, I provide each roof section 10 and 11 with a knuckle-like depressed portion 50 which extends along the longitudinal center line of each such roof section and establishes a point of turbulency adjacent such center line which causes an intimate intermixing of unburned fuel and air at the port and thus builds up the B. t. u. release throughout the latter half of the flame travel across the tank or from port to port.

Melting and boiling zone

In this zone, which is numbered 14, oppositely positioned ports 23 are proportioned so as to permit heavy firing. Roof section 10 over this zone is positioned at such a height as to provide this zone with the proper volumetric capacity for accommodating this heavy firing. In this zone the temperature is built up to top temperature at the foam line, primarily by surface heating due to convection. The volume of fuel burned must be sufficient to offset tank and stack losses, to raise the temperature of the bath to the top temperature at the foam line, and to satisfy the endothermic requirements occasioned by the chemical reactions which take place when the batch or glass making materials are converted into molten glass.

Refining and degassing zone

In this zone, which is numbered 15, medium firing only is required to get the proper B. t. u. release per cubic foot of volumetric zone capacity. The heat required for this zone is only that which is necessary to offset tank and stack losses, to hold the bath at the top temperature acquired by it in zone 14, and to heat the glass bath below the surface. For this reason, oppositely positioned ports 24 are of less height and smaller capacity than ports 23 of zone 14. The roof section 11 for this zone is placed at a lower elevation than roof section 10, in order to hold the shallower flame blanket generated in this zone in close proximity to but out of contact with the surface of the molten bath. It is merely necessary to hold the bath at the top temperature acquired by it in zone 14 for the purpose of obtaining the necessary refining and degassing.

Cooling zone

Shadow wall 16 is located at the floater notches and serves as a flame barrier between the refining and degassing zone, and the cooling zone. This is desirable since the molten bath is required to lose temperature in this zone. The temperature drops from a temperature of approximately 2800° F. acquired in the melting and boiling zone (and which is held in the refining and degassing zone) to a temperature of about 2200° F., at which temperature the glass is suitable for working or withdrawing from the tank.

By the expression, the "maximum permissible B. t. u. release" as used herein, I mean, for the melting and boiling zone, the maximum B. t. u. release which the refractories will stand and for the refining and degassing zone, the maximum B. t. u. release which the surface of the glass bath will stand.

Having thus described my invention, what I claim as new and desire to secure by Letters Patent is:

1. In a tank type glass melting furnace, flat roof sections over the melting and refining zones and which are suspended above said zones at different elevations with that over the refining zone at a lower elevation than that over the melting zone, and a sloping roof section joining said flat roof sections.

2. In a tank type glass melting furnace, flat roof sections over the melting and refining zones and which are suspended above said zones at different elevations with that over the melting zone located at a higher elevation than that over the refining zone and being equipped with a suspended turbulency creating knuckle which extends longitudinally of said zone adjacent its center line.

3. In a tank type glass melting furnace, a shadow wall separating the melting zone from the refining zone and flat roof sections over said separated zones and which are suspended thereabove at different elevations with that over the melting zone at a higher elevation than that over the refining zone and which is equipped, adjacent its longitudinal center line, with a depending turbulency creating knuckle.

4. In a tank type glass melting furnace having oppositely positioned side ports for alternately discharging preheated air into the furnace heating chamber above the tank, flat roof sections over the melting and refining zones of the tank and which are suspended above said zones at different elevations with that over the refining zone at a lower elevation than that over the melting zone; the ports for discharging preheated air into the refining zone being of less capacity than those for discharging preheated air into the melting zone.

5. In a tank type glass melting furnace having oppositely positioned side ports for alternately discharging preheated air into the furnace heating chamber above the tank, flat roof sections over the melting and refining zones of the tank and which are suspended above said zones at different elevations with that over the refining zone at a lower elevation than that over the melting zone; said ports being of a length substantially coextensive with the length of said zones with those of the melting zone being of greater capacity than those of the refining zone.

6. In a tank type glass melting furnace, flat suspended roof sections above the melting, the refining and the cooling zones with the section above the refining zone located at a different elevation than those above the melting and cooling zones, and a shadow wall located between the melting and refining zones.

7. In a tank type glass melting furnace, flat suspended roof sections above the melting, the refining and the cooling zones with the section above the refining zone located at a lower elevation than those above the melting and cooling zones, a shadow wall located between the melting and refining zones, and means for supporting said wall independently of the roof sections above said zones.

8. In a tank type glass melting furnace, flat suspended roof sections above the melting, the refining and the cooling zones, with the section above the refining zone located at a lower elevation than that above the melting zone, a shadow wall located between the melting and refining and a shadow wall located between the refining and cooling zones.

9. In a tank type glass melting furnace, flat suspended roof sections above the melting, the refining and the cooling zones with the section above the refining zone located at a lower elevation than those above the melting and cooling zones, a vertically adjustable shadow wall located between the melting and refining zones, and a vertically adjustable shadow wall located between the refining and cooling zones.

10. In a tank type glass melting furnace, flat suspended roof sections above the melting, the refining and the cooling zones with the section above the refining zone located at a lower elevation than those above the melting and cooling zones, and shadow walls located between the melting and refining and the refining and cooling zones, supported independently of the roof sections above said zones and each being vertically adjustable.

11. In a tank type glass melting furnace, flat suspended roof sections above the melting, the refining and the cooling zones, with those above the melting and cooling zones at substantially the same elevation and with that above the refining zone at a lower elevation.

12. In a tank type glass melting furnace having oppositely positioned side ports for alternately discharging preheated air into the furnace heating chamber above the tank in the melting and the refining zones, flat suspended roof sections above the melting, the refining and the cooling zones; the roof section above the refining zone being located at a lower elevation than that above the melting zone; the ports for discharging preheated air into the refining zone being of less capacity than those of the melting zone.

13. In a tank type glass melting furnace having oppositely positioned side ports for alternately discharging preheated air into the furnace heating chamber above the tank in the melting and the refining zones, flat suspended roof sections above the melting, the refining and the cooling zones; the roof section above the refining zone being located at a lower elevation than those above the melting and cooling zones; a shadow wall between the melting and refining zones, and a shadow wall between the refining and the cooling zones; the ports for discharging preheated air into the refining zone being of less capacity than those of the melting zone.

14. In a tank type glass melting furnace having oppositely positioned side ports for alternately discharging preheated air into the furnace heating chamber above the tank in the melting and the refining zones, flat suspended roof sections above the melting, the refining and the cooling zones; the roof section above the refining zone being located at a lower elevation than those above the melting and cooling zones; a shadow wall between the melting and refining zones, a shadow wall between the refining and the cooling zones; said side ports being of a length substantially coextensive with the length of the zones into which they discharge preheated air, with the ports of the melting zone of greater capacity than those of the refining zone.

15. In a tank type furnace having side ports for alternately discharging preheated air into the furnace heating chamber above the tank, flat roof sections suspended at different elevations above the tank dividing the furnace chamber into different zones, and shadow walls between said zones; said ports being of a length substantially coextensive with the length of said zones.

16. In a tank type furnace having oppositely positioned side ports for alternately discharging preheated air into the furnace heating chamber above the tank, flat roof sections over the melting and refining zones of the tank and which are suspended above said zones at different elevations; said ports being of a length substantially coextensive with the length of said zones with those of the melting zones of greater capacity than those of the refining zone.

17. In a tank type glass melting furnace, separate roof sections above the melting and refining zones with that above the melting zone flat and suspended, and a shadow wall located between the melting and refining zones.

18. In a tank type glass melting furnace, separate roof sections above the melting and refining zones with that above the melting zone flat and suspended, a shadow wall located between the melting and refining zones, and means for supporting said shadow wall independently of the roof sections above said zones.

19. In a tank type glass melting furnace having side ports for alternately discharging preheated air into the furnace chamber in the melting and refining zones, independent roof sections above said zones with that above the melting zone flat and suspended, a shadow wall between the melting and refining zones; the ports of the melting zone being of greater capacity than those of the refining zone.

20. In a tank type glass melting furnace having side ports for alternately discharging preheated air into the furnace chamber in the melting and refining zones, independent roof sections above said zones with that above the melting zone flat and suspended, a shadow wall between the melting and refining zones; the ports of the melting zone being of greater capacity than those of the refining zone and of a length substantially coextensive with the length of the melting zone.

LEVI S. LONGENECKER.